United States Patent [19]
Manjikian

[11] 3,849,305
[45] Nov. 19, 1974

[54] REVERSE OSMOSIS WATER PURIFYING SYSTEM FOR HOUSEHOLD USE

[76] Inventor: Serop Manjikian, P.O. Box No. 183, Del Mar, Calif. 92014

[22] Filed: Mar. 27, 1973

[21] Appl. No.: 345,447

Related U.S. Application Data

[63] Continuation-in-part of Ser. No. 256,185, May 23, 1972.

[52] U.S. Cl................ 210/116, 210/120, 210/138, 210/321, 210/409
[51] Int. Cl....................... B01d 31/00, B01d 13/00
[58] Field of Search ............ 210/23, 120, 138, 321, 210/332, 409, 411, 500; 55/16, 158

[56] References Cited
UNITED STATES PATENTS

| | | | |
|---|---|---|---|
| 1,825,631 | 9/1931 | Horvath | 210/23 |
| 3,369,667 | 2/1968 | Clark et al. | 210/321 |
| 3,396,103 | 8/1968 | Huntington | 210/321 |
| 3,491,887 | 1/1970 | Maestrilli | 210/409 |
| 3,552,566 | 1/1971 | Lowe | 210/321 |
| 3,616,929 | 11/1971 | Manjikian | 210/321 |
| 3,619,425 | 11/1971 | Blair et al. | 210/138 |
| 3,672,509 | 6/1972 | Buchmann et al. | 210/321 |

*Primary Examiner*—Frank A. Spear, Jr.
*Assistant Examiner*—Ferris Lander
*Attorney, Agent, or Firm*—Clement H. Allen

[57] ABSTRACT

A household water purifying system employs a reverse osmosis purifying unit in which a porous, semipermeable membrane-covered support, or preferably a frame carrying a plurality of membrane elements having semipermeable membrane outer surfaces, is rotated within a pressure resistant container. Water under household pressure is introduced into the purifying unit and water more concentrated in salts originally present is released from the purifying unit by an automatically actuated on-off valve. Purified water produced by the purifying unit is delivered to an unpressurized water storage tank so that no back pressure can be applied to the membrane from its product water side. Purified water is dispensed from the water storage tank by a submerged pump and a valve; and water is maintained not above a predetermined level in the water storage tank by a float actuating a release valve.

5 Claims, 1 Drawing Figure

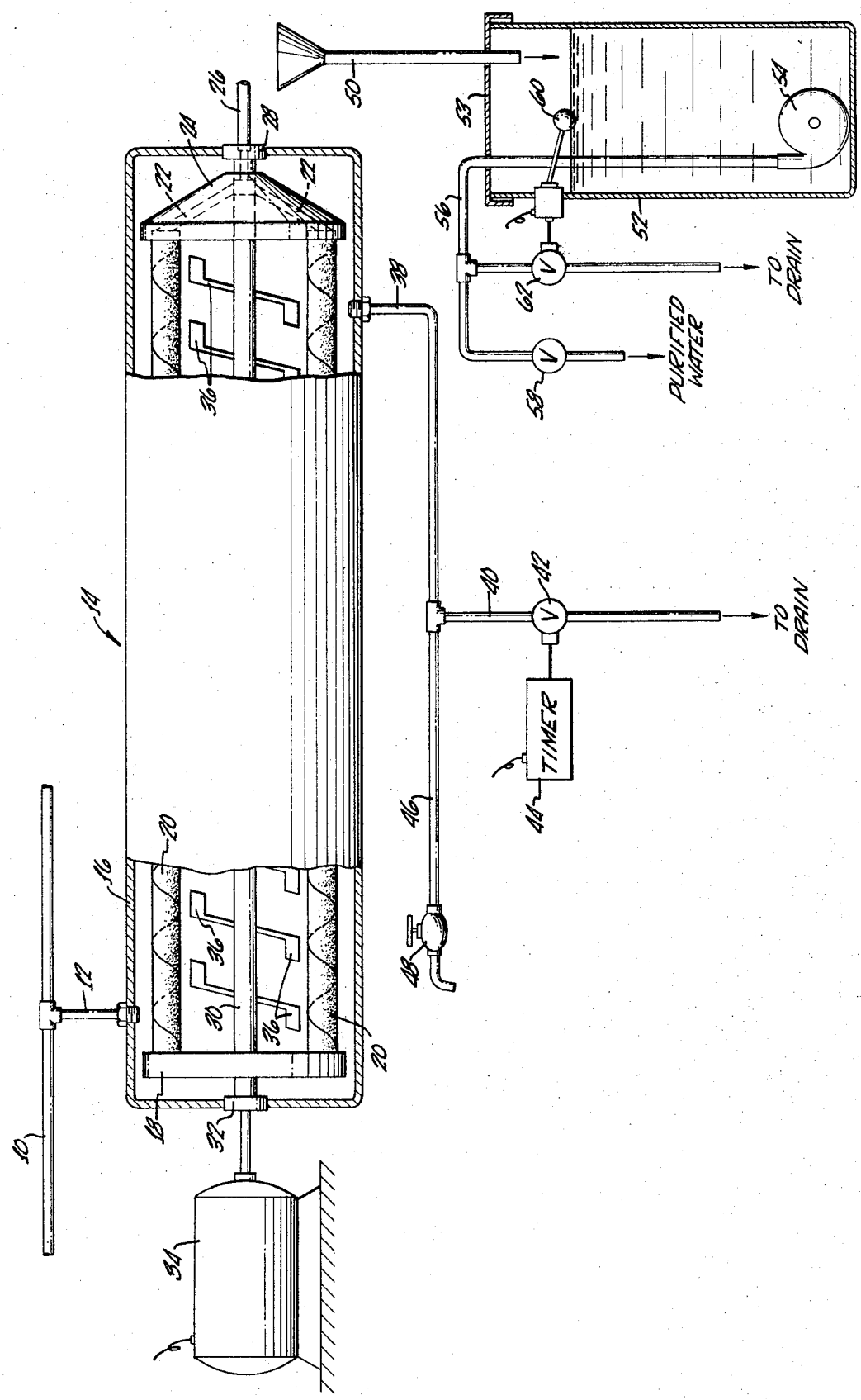

3,849,305

REVERSE OSMOSIS WATER PURIFYING SYSTEM FOR HOUSEHOLD USE

CROSS REFERENCE

This application is a continuation-in-part of my co-pending application Ser. No. 256,185 filed May 23, 1972.

BACKGROUND OF THE INVENTION

1. Field of the Invention

This invention relates to a reverse osmosis water purifier particularly suitable for household use.

2. The Prior Art

The prior art has proposed and used a number of types of reverse osmosis systems of relatively small capacity to produce purified water for household use. Some of these have employed a pump to raise the pressure of the water supply to several hundred pounds or so per square inch before introduction into the module containing the semipermeable membrane assembly. The pump also supplies the feed water to the semipermeable membrane module in sufficient volume to maintain adequate turbulence in the water flowing over the membrane surfaces in order to eliminate deleterious so-called boundary layer effects. Prior art systems have almost always included a restrictor or back pressure control valve to maintain design working pressure in the membrane module while releasing a metered flow of water more concentrated in salts originally present in the feed water to waste.

Purified water produced by prior art reverse osmosis systems has often been stored in a container under pressure to ensure transfer through piping to various points of use. At times, if water is not consumed, a pressurized product water container can cause a build-up of pressure on the output side of the membrane which reduces the pressure drop across the membrane and substantially reduces its efficiency. In the case of systems working from household line pressure without a pressure raising pump, any back pressure from the product storage end can result in a critical reduction in operating pressure differential.

The water purifying system of this invention eliminates any back pressure on the semipermeable membrane resulting from a pressurized water storage system. No restrictor or back pressure control valve is needed yet full line pressure is applied to the semipermeable membrane except for brief flush intervals. No high pressure pump is employed, yet boundary layer effects in the membrane module are efficiently controlled.

BRIEF SUMMARY OF THE INVENTION

Summarized briefly, the water purifying system of this invention comprises a semipermeable membrane mounted on a porous support inside a pressure resistant container. Water under household pressure is introduced into the pressure container and means are provided to maintain turbulent flow of water over the membrane surface. Preferably a frame is arranged inside the water purifying unit carrying a plurality of elements having membrane covered surfaces, the frame being rotated to provide turbulence over the membrane surfaces.

No restrictor or back pressure control valve is used in the system. The outflow control for water more concentrated in salts originally in the feed water and hereinafter termed "concentrate" comprises an on-off valve which is opened periodically at predetermined intervals to release brine and flush the water purifying unit. A dispensing valve which draws household line water through the water purifying unit may be installed for supplying water when required for various purposes not requiring purified product water.

The purified water passing through the semipermeable membrane, or membranes, is delivered into an open, that is unpressurized storage tank from which it may be dispensed by suitable means such as a submerged pump and a valve. Means are arranged to automatically maintain a predetermined level of purified water in the purified water storage tank. Preferably a float is employed to control output from the submerged pump through a solenoid valve in a line leading to drain or waste. The level of purified water in the purified water storage tank is thus maintained for dispensing when needed, while there is essentially no back pressure against the output side of the semipermeable membrane or membranes.

BRIEF DESCRIPTION OF THE DRAWINGS

The apparatus and method of this invention will become clear from the following description thereof and from the annexed drawing in which the single FIGURE illustrates, diagramatically, apparatus embodying features of this invention.

DESCRIPTION OF A PREFERRED EMBODIMENT

Referring now to the single FIGURE of the drawing, feed water is drawn at household pressure, which may be of the order of 50 to 100 psi more or less, from main 10 through connecting pipe 12 into a reverse osmosis purifying unit 14. The purifying unit 14 comprises a pressure resistant container 16 in which is rotatably mounted a frame 18 carrying a plurality of spaced apart membrane elements 20. Such membrane elements are formed with a pressure resistant, porous core having an outer helical winding of semipermeable membrane strip as more particularly described and claimed in my U.S. Pat. No. 3,578,175. The purified water collected from the cores of membrane elements travels through channels 22 in header 24 and passes out of the end of pressure resistant container 16 through hollow shaft 26 which is suitably sealed to the end of pressure resistant container 16 by seal 28. Frame 18 is arranged with a central shaft 30 which may conveniently be attached to, or made as an internal extension of hollow shaft 26 and which passes through seal 32 in the other end of pressure resistant container 16. Shaft 30 is rotated by external means such as electric motor 34. Shaft 30 may be provided with attached internal blades 36 which additionally agitate the water passing through purifying unit 14 when frame 18 carrying membrane elements 20 is rotated by motor 34.

The concentrate produced inside pressure resistant container 16 by extraction of purified water from the feed, is released through outlet 38 which is preferably remote from feed inlet 12 and which is directly connected by line 40 to valve 42 and thence to drain. Valve 42 is an on-off valve preferably of the solenoid actuated type and controlled to open for short periods at predetermined intervals by timer 44. Regular intermittent release of brine from pressure resistant container 16 is arranged so that valve 42 is opened at intervals of from about 1 to about 6 hours to dump brine. The amount of brine dumped with each opening of valve 42 is preferably not less than the volume of water contained in pressure resistant container 16 and preferably from 1 to 5 times this volume, so that effective flushing of salts and foreign material from pressure resistant container 16 is obtained.

Optionally, an additional line 46 may be connected to brine outlet line 38 and this is connected to a common dispensing valve or faucet 48. Water from main 10 may be obtained by simply opening faucet 48, the supplied water passing through purifying unit 14. Opening faucet 48 can supply water for household needs not requiring purified quality water as hereinafter described. When water is obtained by opening valve 48, the water passing through pressure resistant container 16 provides an additional flushing action and can contribute to its efficient operation.

The purified water released from pressure resistant container 16 through hollow shaft 26 is led through pipe 50 for delivery into open or unpressurized purified water storage tank 52 which may be provided with a loose, that is not pressure tight, lid or closure 53. Associated with purified water storage tank 52 are means for dispensing purified water therefrom under pressure such as submerged pump 54 for supplying pressurized purified water through line 56 to valve 58 which may be of the manual type, from which it is dispensed for use requiring water of the purity produced. Also arranged in purified water storage tank 52 are means for automatically releasing purified water from said purified water storage tank when the purified water level therein rises above a predetermined level. In the embodiment illustrated such means comprise a level sensing device such as float 60 which controls solenoid-actuated valve 62 in a line leading from the output of submerged pump 54 and which opens when required to allow excess purified water to be pumped to drain.

In operation the water purifying system is connected by line 12 to a water supply line or main 10 which will introduce feed water into pressure resistant container 16 under household pressure of from 50 to 100 psi more or less. Frame 18 carrying membrane elements 20 inside pressure container 16, is rotated by electric motor 34 to provide agitation and turbulence over the membrane surfaces to eliminate deleterious boundary layer effects, that is formation of layers of solution having high solute content at the membrane surfaces, and to keep the concentration of salts substantially uniform throughout the water in pressure container 16. Timer 44 is adjusted so that valve 42 opens, for example, once every 4 hours for a short period of time to replace the relatively concentrated water in pressure resistant container 16 with fresh feed water. Household water may also be obtained by opening faucet 48.

Meanwhile purified water is being delivered from purifying unit 14 through pipe 50 into purified water storage tank 52. Purified water is obtained by opening valve 58 to dispense water from water storage tank 52 through line 56 pressurized by pump 54. preferably the submerged pump 54 is running continually, pumping against an esentially dead end, namely the normally closed manual dispensing valve 58 and the automatic solenoid valve 62 which is controlled by float 60. The level of purified water in storage tank 52 is maintained by float 60 and solenoid valve 62 at a convenient level, even though the water purifying unit 14 may be producing purified water in excess of that required for dispensing through valve 58.

The rotating membrane element assembly, which itself is described is more detail and claimed in my copending patent application Ser. No. 265,185 filed May 23, 1972, provides effective turbulence and agitation within pressure resistant container 16 so that deleterious boundary layer effects are eliminated without the necessity of a high pressure pump introducing a relatively large flow of feed liquid. Under these conditions the periodically opened concentrate release valve 42 can very efficiently and inexpensively control the concentration of salts in pressure resistant container 16. No restrictor or back pressure regulator is required. The action of valve 42 also flushes pressure resistant container 16 with fresh feed water, and flushing effects may be supplemented when faucet 48 is opened.

The open, unpressurized water storage tank 52, eliminates the possibility of purified water back pressure against the membrane which could result in backflow of water, salts and bacteria, or even membrane system failure when pressure on both sides of the membrane is equalized as is potentially the case when a pressurized purified water storage tank is employed. The unpressurized product water storage tank enables full line pressure to be applied to the feed side of the membrane at all times except, of course, when faucet 48 or valve 42 is temporarily opened. This results in excellent efficiency from the relatively low household water supply pressure.

The purifying unit 14 is arranged to make water continuously with any excess automatically released from the purified water storage tank 52 as desired. Thus the reverse osmosis unit continues to operate at peak efficiency and purified water is available under pressure from submerged pump 54 whenever required.

I claim:

1. A water purifying system having a reverse osmosis water purifying unit comprising a semipermeable membrane mounted on a porous support within a pressure resistant container, means for introducing feed water under pressure into said pressure resistant container, means for releasing concentrate from said pressure resistant container, and means for storing and dispensing purified water passing through the semipermeable membrane in said water purifying unit, in which the improvement comprises:

a. a pipe connecting water under household pressure to the feed inlet of said pressure resistant container;

b. said semipermeable membrane being mounted on a porous support which is rotatable within said pressure resistant container and having external means for rotating said porous support; and, c. means including an on-off valve for automatically periodically releasing concentrate directly from said pressure resistant container to drain.

2. A water purifying system according to claim 1 in which a plurality of semipermeable membrane elements are arranged in spaced relation in an assembly rotatably mounted within said pressure resistant container, and motor means outside said pressure resistant container are connected to said assembly for rotation thereof.

3. A water purifying system according to claim 1 in which said means for automatically releasing concentrate from said pressure resistant container is a timer-actuated solenoid valve.

4. A water purifying system according to claim 3 in which said timer actuated valve is set to open at an interval of from 1 to 6 hours.

5. a water purifying system according to claim 4 in which said timer actuated solenoid valve is set to open said valve at an interval of from 1 to 6 hours for a period to release brine and water in amount between 1 and 5 times the capacity of said pressure resistant container.

* * * * *